United States Patent [19]
Munz et al.

[11] 4,271,381
[45] Jun. 2, 1981

[54] WINDSHIELD WIPER MOTOR CIRCUIT

[75] Inventors: Joachim Munz, Gemmrigheim; Hans Prohaska; Horst Rachner, both of Bietigheim-Bissingen, all of Fed. Rep. of Germany

[73] Assignee: ITT Industries, Inc., New York, N.Y.

[21] Appl. No.: 97,914

[22] Filed: Nov. 28, 1979

[30] Foreign Application Priority Data

Nov. 30, 1978 [DE] Fed. Rep. of Germany ....... 2851727

[51] Int. Cl.³ .............................................. B60S 1/04
[52] U.S. Cl. .................... 318/282; 318/286; 318/467; 318/444; 318/DIG. 2; 15/250.13
[58] Field of Search ............... 318/261, 265, 266, 275, 318/282, 286, 293, 467, 470, DIG. 2, 443, 444; 15/250.13, 250.14, 250.15, 250.16

[56] References Cited

U.S. PATENT DOCUMENTS

| | | | |
|---|---|---|---|
| 2,528,181 | 10/1950 | Sacchini | 318/275 |
| 3,675,103 | 7/1972 | Elliott | 318/DIG. 2 |
| 3,689,817 | 9/1972 | Elliott | 318/DIG. 2 |

*Primary Examiner*—J. V. Truhe
*Assistant Examiner*—John W. Redman
*Attorney, Agent, or Firm*—James B. Raden; Donald J. Lenkszus

[57] ABSTRACT

A windshield wiper motor control circuit is described which is directed to controlling a reversible motor. A reversing switch is switched by a relay which is controlled via switches characterizing the end positions of the wiper blade traverse of the windshield. A delay interval may be provided prior to each time the motor direction is reversed to provide intermittent operation.

9 Claims, 6 Drawing Figures

WINDSHIELD WIPER MOTOR CIRCUIT

BACKGROUND OF THE INVENTION

This invention relates to a circuit arrangement for a reversible motor such as a windshield wiper motor.

In known circuit arrangements for a wiper motor which is reversible with respect to the direction of rotation, a reversing switch is employed having changeover bridging contacts directly changed over by a switching cam driven by the motor. The changeover speed, and thus, the load of the reversing switch, depends on the number of revolutions of the wiper motor which in practice can vary considerably. In these arrangements, electrodynamic braking of the motor by short circuit cannot be utilized, and accordingly, the wiping angle varies considerably.

This invention is directed to providing a circuit arrangement of the aforementioned type which functions without trouble over a longer operating time and meets all operating requirements.

SUMMARY OF THE INVENTION

In accordance with the invention, the changeover bridging contacts are simultaneously actuated via a relay so that their switching time is dependent of the number of revolutions of the motor. Wearing of the contacts of the reversing switch is thereby substantially diminished.

In one embodiment of the invention, only a relay and a particularly developed limit switch are necessary. A self-holding circuit is realized by the limit switch so that a storage effect is provided. When the motor is in an end position, dynamic or short-circuit braking is not provided before reversing the supply voltage of the motor. However, due to the particular development of the manually actuable operating switch, short-circuit braking can be realized when the motor is switched off.

In another version which offers more possibilities of variation, the relay is controlled via a store. In addition, one stationary contact of the reversing switch is reversed via a limit switch, whereby on the one hand, it is ensured that the motor is switched off in the end position or in the parking position even if the relay or the store should be defective, and on the other hand, short-circuit braking can be realized thereby. The motor is switched on by a switching operation of the relay. The switching off and, if applicable, the dynamic braking of the motor, is effected via the limit switch. Thus, it is possible to have these two switching operations carried out with a delay in time. The motor is switched off via the limit switch as in the aforementioned known arrangement, but it is not changed over by this limit switch so that the contact load is smaller than in the known arrangement. A time interval may be provided between switching off of the motor and switching it on again in reverse direction of rotation so that by this circuit arrangement, intermittent wiper installation can be realized. The interval time can thereby be of fixed duration or can also be varied. The interval time may be variable in the end position of the wiper motor, but a predetermined constant in the parking position.

The interval time may be variable in the end position, as well as in the parking position of the motor, in accordance with an especially preferred embodiment. Only one regulating element is provided for this purpose.

BRIEF DESCRIPTION OF THE DRAWINGS

The invention is described below in detail by way of the embodiments shown in the accompanying drawings wherein.

DETAILED DESCRIPTION OF THE DRAWINGS

Figure 1:
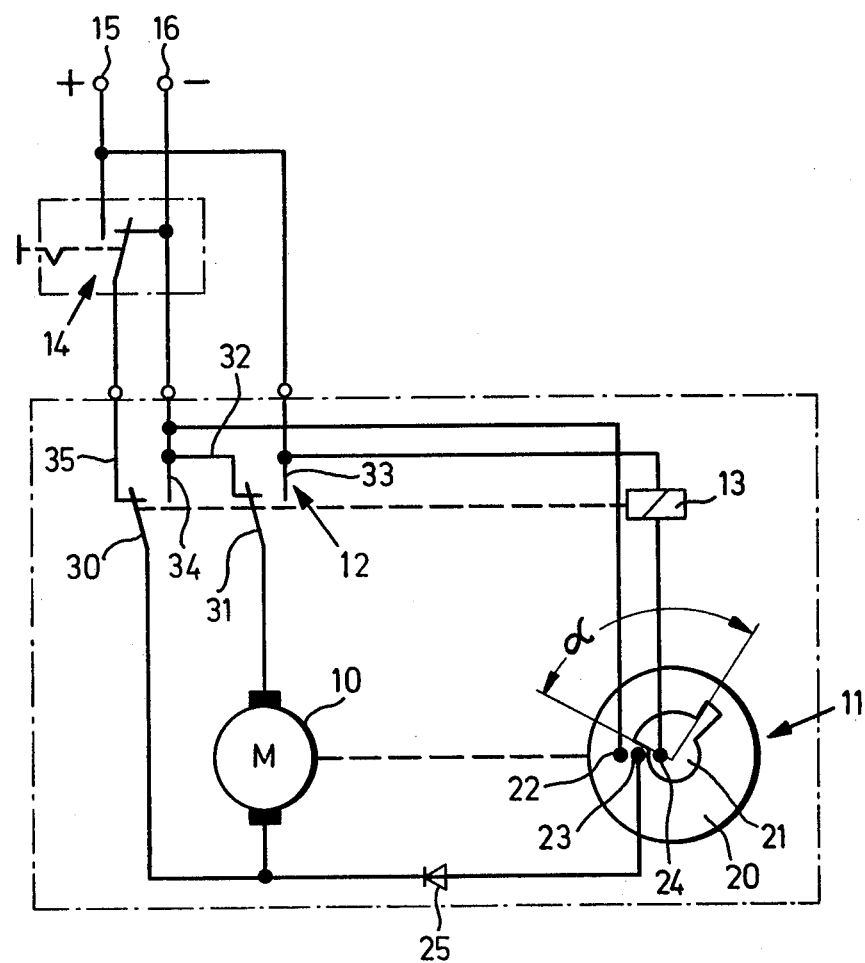
FIG. 1 is a schematic circuit diagram of a first embodiment comprising a relay with self-holding circuit.

In FIG. 1, the wiper motor is designated by 10 and drives a limit switch designated generally by 11. A reversing switch 12 is switched by a relay 13. An operating switch to be manually actuated is designated by 14. Positive potential of a voltage source not shown in detail is applied to the terminal 15 and negative potential to the terminal 16.

The limit switch 11 consists of a switch wafer 20 with a conductive segment 21 on which three contact springs 22, 23, 24 may slide. Because of this design of the limit switch 11, a wiper angle $\alpha$ is predetermined. The relay 13 on the one hand is connected to the positive terminal of the voltage source and on the other hand to the contact spring 24 in an electrically conductive manner. The second contact spring 22 is continuously applied to negative potential. The third contact spring 23 is connected with the one terminal of the motor 10 via a diode 25.

The resetting switch 12 has two movable changeover bridging contacts 30 and 31 which are connected to the motor 10 in an electrically conductive manner. Each changeover bridging contact cooperates with a pair of stationary contacts. Stationary contacts 32 and 33 are continuously connected to the negative and positive terminals of the voltage source, respectively. The stationary contact 34 of the other pair of stationary contacts is continuously applied to negative potential. In contrast thereto, the second stationary contact 35 can selectively be connected to positive or negative potential via the operating switch 14 designated as a changer. Thus, in the rest position, the operating switch to be manually actuated connects the two stationary contacts 34 and 35 of the one pair of stationary contacts.

The circuit arrangement according to FIG. 1 operates as follows. In the rest position shown in the drawing, the motor 10 is short-circuited because the one changeover bridging contact 31 is applied to negative potential and also the other changeover bridging contact 30 is connected to the terminal 16 via stationary contact 35 and operating switch 14. If the operating switching 14 is changed over, the motor circuit is closed. The operating current flows to the negative terminal 16 of the voltage source via operating switch 14, stationary contact 35, changeover bridging contact 30, motor changeover bridging contact 31, stationary contact 32. The motor rotates in counter-clockwise direction. At first, the relay 13 is de-energized. The control circuit is interrupted because the contact springs 22 and 23 are resting upon the non-conductive part of the switch wafer 20. The relay 13 remains de-energized too when the contact spring jumps on the conductive segment 21 for positive potential is applied to the changeover bridging contact 30 and thereby as well as to the diode 25. Only then, when the switch wafer 20 turned on the angle of traverse α, the contact spring 22 being connected to negative potential jumps on the conductive segment 21 and the relay 13 is energized. Thereby, the changeover bridging contacts 30 and 31 are switched over. Negative potential is now applied to the changeover bridging contact 30 and thereby to the diode 25 so that a self-holding circuit for the relay 13 is closed. If the motor rotates in clockwise direction, the energizing circuit for the relay 13 is indeed very soon interrupted again via the contact spring 22, but the self-holding circuit via contact spring 23, diode 25 and changeover bridging contact 30 continues to exist until the switch wafer 20 turned again on the angle of traverse α. If this is the case, the relay 13 is de-energized again and the reversing switch 12 is again changed over so that the motor changes its direction of rotation. The process is repeated continuously so that the wipers driven by the motor are moved over the pane to be cleaned in the usual manner. If the operating switch 14 is brought to its rest position again, the motor immediately enters the parking position shown in the drawing. Thereby, the motor, if required, immediately changes its direction of rotation, for upon switching over the operating switch 14 into the rest position, the relay 13 is immediately energized via the diode 25 and the limit switch 11, unless the wiper motor just occupies the parking position. Thus, the relay 13 is energized in order to provide that the motor can enter the parking position. The operating switch 14 prepares the short-circuit braking circuit which is closed when the relay 13 is de-energized again and the reversing switch again occupies the position shown in the drawing. In this embodiment above all, the economical construction is essential because besides the reversing switch and the operating switch to be manually operated, only a limit switch 11 which has a special design and can be easily built up, a relay 13 and a diode 25 are necessary, whereby said diode does not carry operating current. However, in this circuit arrangement, no short-circuit braking is possible in the end position. The changeover bridging contacts indeed are switched very rapidly, but the current load is relatively high.

Figure 2:
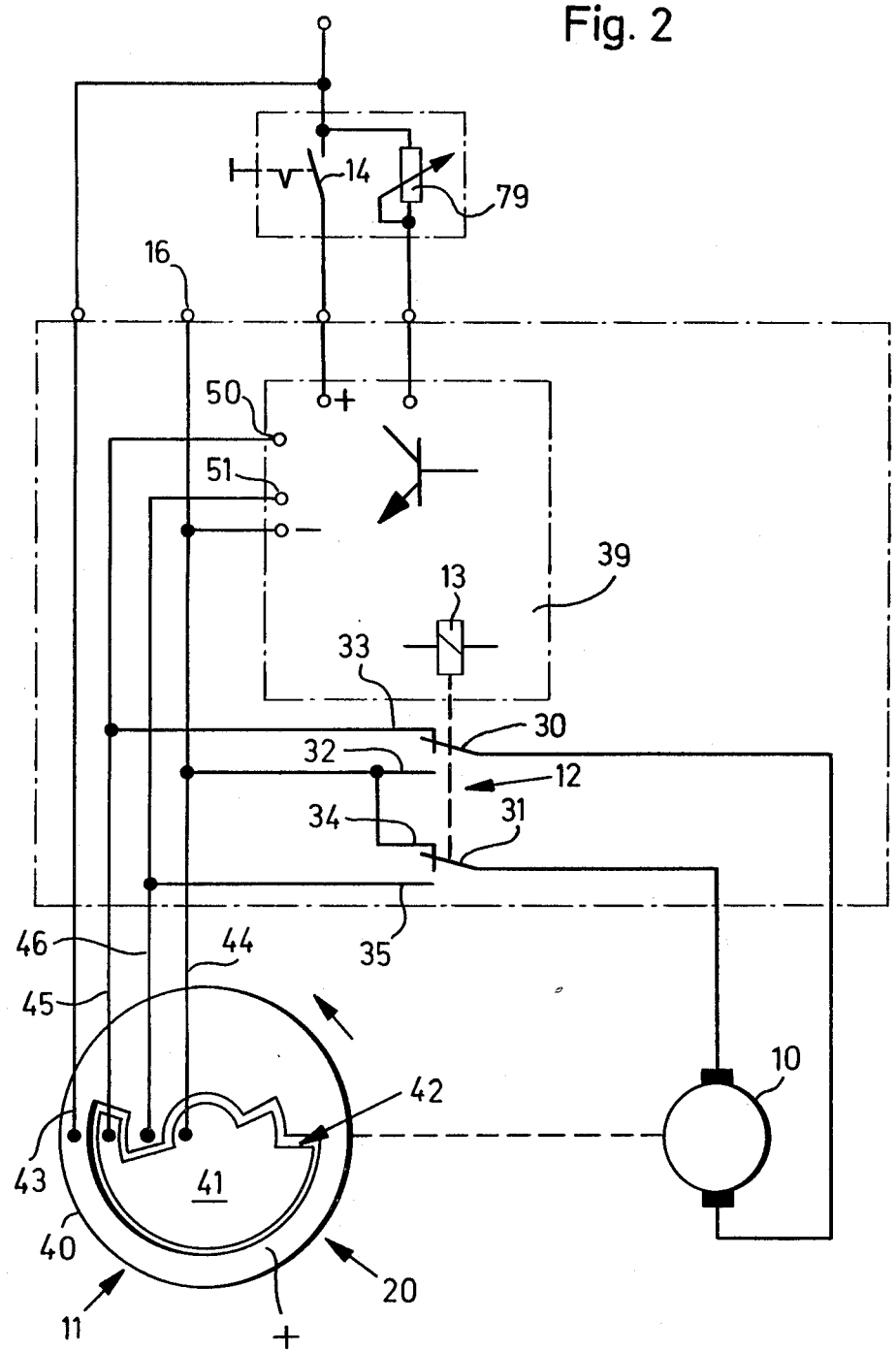
FIG. 2 is a schematic circuit diagram of an embodiment comprising a storage-controlled relay, whereby the control circuit for the relay is shown as a block only.

Circuit arrangements, according to the FIGS. 2 to 6 which are described below, are more advantageous, but also more complicated. In the following description, parts having the same function show the same reference numerals. FIG. 2 shows a schematic circuit diagram, whereby the control circuit for the relay 13 is indicated as a block. It can be seen that the changeover bridging contacts 30, 31 again are simultaneously actuated by a relay 13. But there is a substantial difference in that as the stationary contacts 33, respectively 35, are not directly connected to the terminals of the voltage source, but are switched via the limit switch 11. The limit switch 11 again consists of a switch wafer 20 with two conductive contact segments 40 and 41 which are separated by an insulating gap 42. Via the contact spring 43, the contact segment 40 is continuously connected to the positive terminal of the voltage source. The contact segment 41 is continuously connected to the negative terminal of the voltage source via the contact spring 44. In the rest position shown in the drawing, a contact spring 45 rests upon the contact segment 41, thus is connected to ground, but outside of this parking position is connected to the positive terminal via the contact segment 40. In the position shown, the other contact spring 46 is connected to the positive terminal nearly during the entire motional action via the contact segment 40 and is only in the end position connected to the negative terminal via the contact segment 41. The limit switch thus practically consists of two two-way switches, whereby the movable bridging contacts are realized by the contact spring 45, respectively 46, which alternately may be connected to the positive or negative terminal of the voltage source. From this description, it can be seen that the motor operating current is conducted via said limit switch and the reversing switch 12 which thereby ensures the switching off of the wiper motor when the relay 13 or the entire control circuit should be defective.

Figure 3:
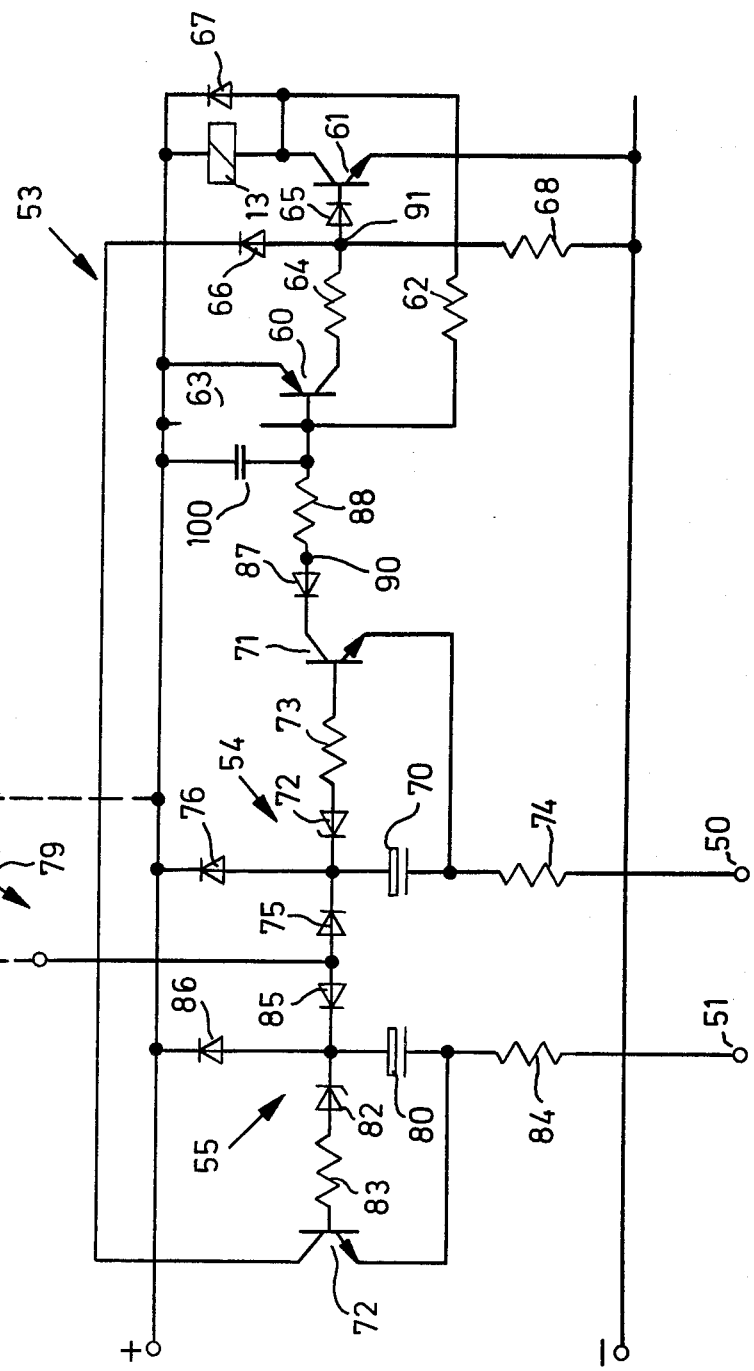
FIG. 3 is a first embodiment of the control circuit indicated as a block in FIG. 2.

The contact spring 45 is connected in an electrically conductive manner to an input 50 of the control circuit shown in detail in FIG. 3, and the contact spring 46 to an input 51. The control circuit substantially consists of a storage 53 and two delay networks 54 and 55.

The storage 53 contains a control transistor 60 and a power transistor 61 for the purpose of controlling the relay 13. The output signal of the power transistor 61 is fed back to the input of the control transistor 60 via the resistor 62, whereby the storage effect is achieved. The resistor 63 serves for the depletion of the control transistor base 60. The purpose of the resistor 64 is to couple the two transistor stages and to limit the base current for the power transistor 61. A decoupling diode is designed by 66. The diode 67 serves for the purpose of protecting the power transistor 61. The resistors 68 and 64 form a base voltage divider for the power transistor 61.

The two delay networks 54 and 55 each contain one capacitor 70, respectively 80, the charging voltage of which serves as control voltage for a transistor 71, respectively 81. The zener diodes 72, respectively 82, effect the creation of a threshold value, the resistors 73, respectively 83, serve for current limitation purposes. The purpose of the diodes 75, respectively 85, is to decouple the signals, the diode 87 serves for the purpose of signal input, the diodes 76, respectively 86, are discharging the capacitors 70, respectively 80. The resistor 88 limits the base current of the control transistor 60.

In the control circuit shown, the node 90 can be regarded as set input of the storage 53 and the nodal point 01 as a reset input. If nearly ground potential is applied to the set input, the control transistor 60 becomes conductive so that also the power transistor 61 becomes conductive and the relay 13 is energized. This switching condition of the storage continues to exist due to the feedback via the resistor 62 in case the ground signal on the set input drops out.

The power transistor 61 is immediately switched off when a reset signal may be measured on the reset input 91. Thus, also the power transistor 60 is blocked immediately via the feedback resistor 62 so that this switching condition continues to exist too when the reset signal drops out on the reset input 91. The delay network 54 is connected in series to the set input 90 and the delay network 55 is connected in series to the reset input 91 via the diode 66. If, for instance, we start from the fact that the capacitor 70 is discharged and then ground potential is applied to the control input 50 via the limit switch, the capacitor 70 can recharge via variable resistor 79, diode 75 and protective resistor 74. As soon as the charging voltage exceeds the threshold value predetermined by the zener diode 72, the transistor 71 becomes conductive and thereby applies ground potential to the set input 90. The corresponding process is carried out also with respect to the delay network 55, whereby it is pointed out to the fact that in this embodiment, the variable resistor 79 determines the time constant of the two delay networks 54, respectively 55. This means in practice that the storage 53 is set via the control input 50 and reset via the control input 51. However, thereby the setting or resetting is effected with a delay in time compared to the switching process on the control input 50, respectively 51. This has the following effect on the circuit arrangement according to FIG. 2.

In the rest position of the limit switch 11 shown in the drawing, negative potential is applied to the control input 50 via the contact spring 45 and positive potential is applied to the control input 51. The capacitors 70, respectively 80, are discharged because the operating voltage is interrupted via the operating switch 14. If the operating switch is actuated now and thereby the voltage supply for the relay 13 as well as for the entire control circuit is switched on, the capacitor 70 recharges and after a given delay time, makes the transistor 71 conductive. Thus, the storage is set, the relay 13 is energized and changes over the reversing switch 12. The changeover bridging contact 30 is now applied to negative potential, the changeover bridging contact 31 to positive potential via the contact springs 46 and 43. The motor rotates in anti-clockwise direction. After a short time, the contact spring 46 connected to the control input 50 jumps on the contact segment 40 and is subjected to positive potential so that the capacitor 70 is discharged again. This does not affect the switching condition of the storage 53. If, however, the switch turned on the wiper angle α, the contact spring 46 jumps on the contact segment 41 connected to negative potential. Thereby, the changeover bridging contact 31 is applied to ground potential too and the motor is short-circuited. At the same time, ground potential is applied on the control input 51 so that the capacitor 80 recharges. After a given delay time, the transistor 72 becomes conductive and switches ground potential to the reset input 91 of the storage via the decoupling diode 66 so that the relay is de-energized again. Thereby, the reversing switch 12, the changeover bridging contact 30 of which is now applied to positive potential via the contact spring 45, is changed over again, while the changeover bridging contact 31 is applied to ground potential. The motor now rotates in opposite direction until the contact spring 45 again occupies at last the rest position shown in the drawing, and thus, both changeover bridging contacts of the reversing switch are grounded again and the motor is braked dynamically. This process is repeated continuously, whereby the delay time between switching on and off the motor and the reversed direction of rotation is predetermined by the delay network 54 respectively 55. The delay time can be selected so short that it will not be noticed by an observer. Thereby, this circuit arrangement has the advantage that the reversing voltage is only applied to the dynamically braked motor, but not to the slowing down motor. Thereby, the contact load is substantially reduced.

The delay time of the delay networks, however, can also be selected so big that the wiper motor comes to a standstill for a given interval period as well as in the parking position as also in the end position. Thereby, the so-called intermittent wiper operation can be realized in simple manner. The intermittent wiper operation is then preferred when the pane to be cleaned is only slightly moistened with a liquid coating.

Figure 4:
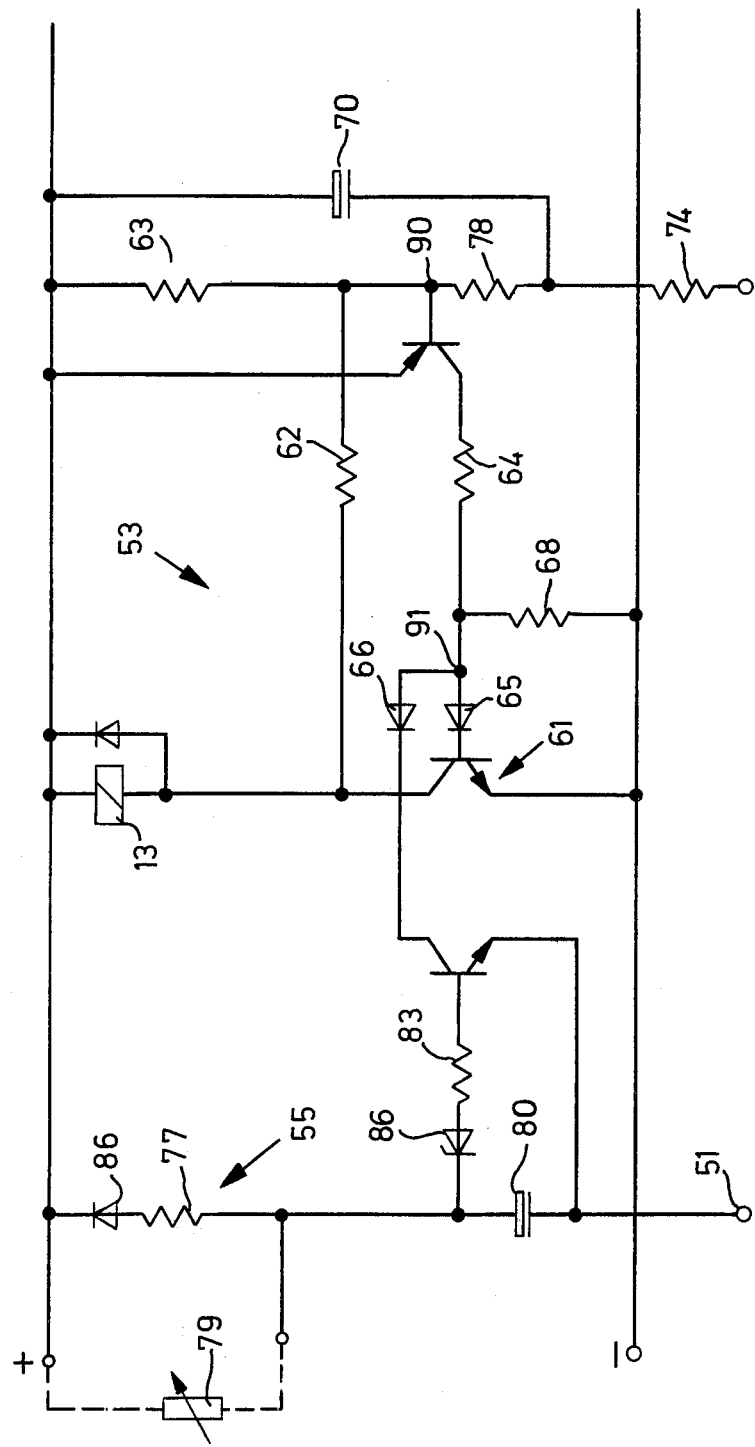
FIG. 4 illustrates a second embodiment of a control circuit.

By means of this circuit arrangement according to FIG. 3, it can also be seen that further alternative versions can be obtained by varying the delay networks. For instance, it is possible to adjust the delay network 54 to a given, preferably short value and only to vary the interval period predetermined by the delay network 55. One can, of course, abandon adjustable interval periods. The delay networks then adjusted to a given but very short time are nevertheless justified because they ensure that the motor can only be switched on from the rest position. Of course, such alternatives result in a simplified control circuit as it is shown by FIGS. 4 and 5.

The circuit arrangement according to FIG. 4 again contains a storage 53, the elements of which are designated with the same reference numerals as in FIG. 3. A timing element 55 is provided which is connected in series to the reset input 91. The time constant of said delay network 55 is adjustable via the variable resistor 79. Thereby, in the end position, the interval period of the motor may be varied. The additional resistor 77 serves as current limitation resistor for the diode 86.

A delay network, in this case consisting of the capacitor 70 and an additional resistor 74 only, acts on the set input 90 too. This simple circuit arrangement without a transistor is possible because only a short delay time is to be realized via the capacitor 70.

Figure 5:
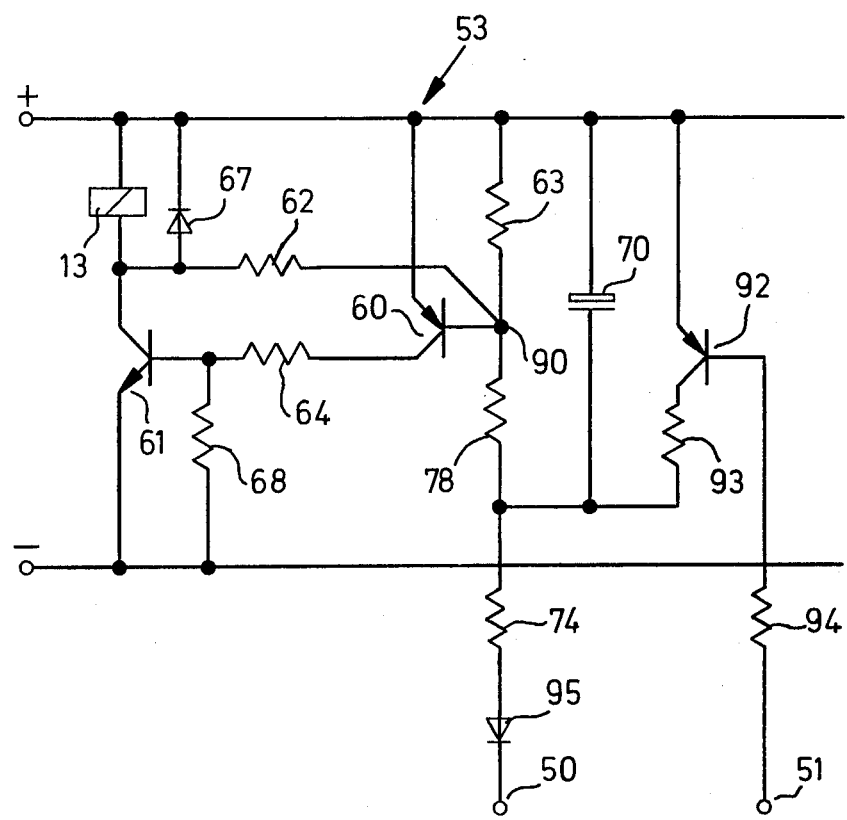
FIG. 5 illustrates a third embodiment of a control circuit.

FIG. 5 shows a further embodiment without any adjustable interval period, whereby the capacitor 70, however, acts as a delay element in the end position as well as in the parking position. In difference to the preceding embodiments, now the set input and the reset input are practically identical. If the operating switch 14 is actuated in the rest position shown in FIG. 2, the transistor 60 is connected through via the resistor 74 and the diode 95 to the control input 50 grounded after a short delay time due to the charging time of the capacitor and thus, the relay is energized. If in the end position the control input 51 is grounded, the transistor 92 is controlled via the additional resistor 94 so that the capacitor 70 can discharge via the additional resistor 93 and the collector-emitter path of the transistor 92. After a given delay time, thus in the nodal point 90 which now serves as reset input, a sufficiently high positive voltage will be available so that the control transistor 60 and as well as the power transistor block and the relay 13 de-energizes again.

Figure 6:
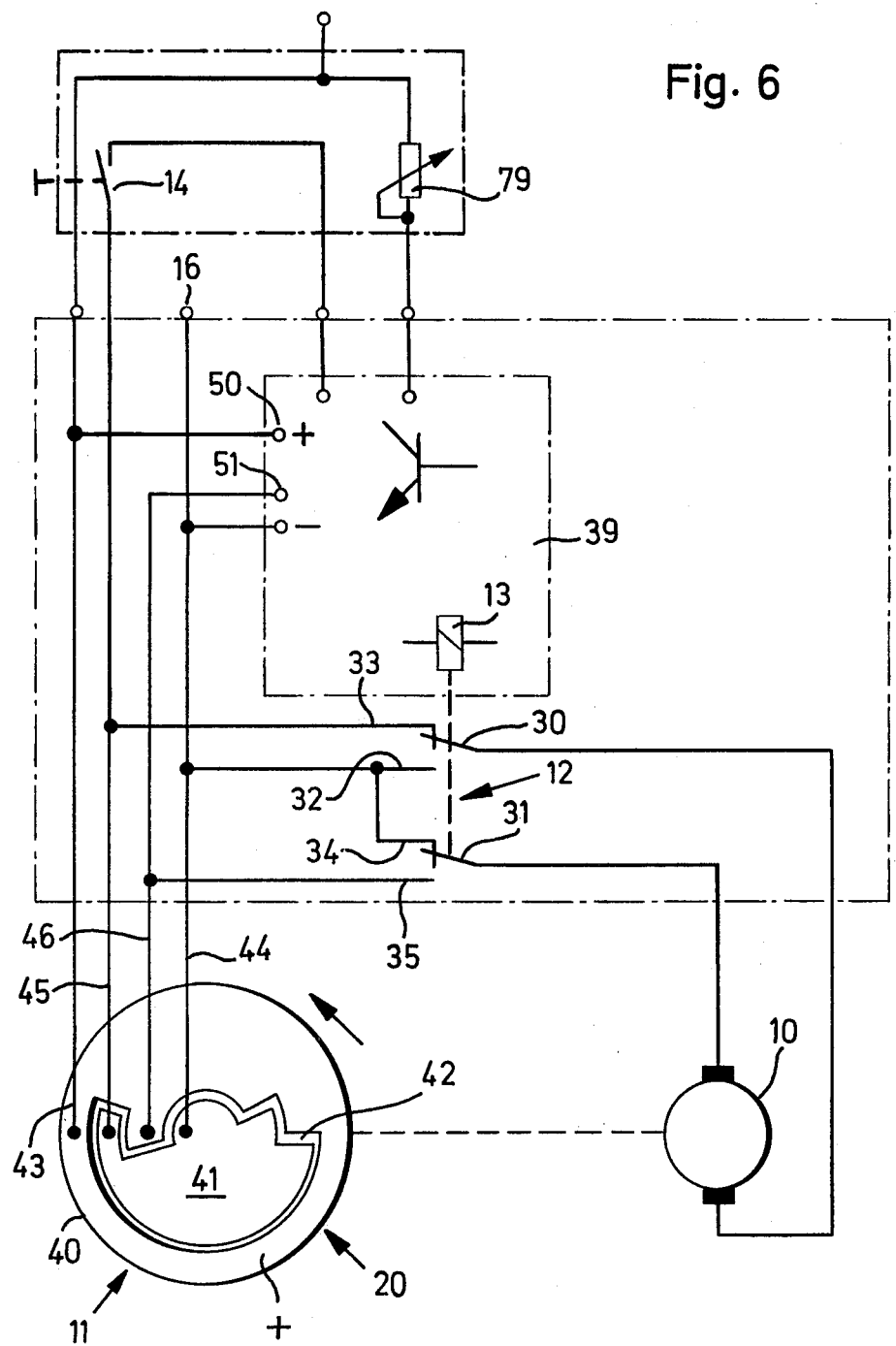
FIG. 6 is a second version of a schematic circuit diagram similar to FIG. 2, whereby the versions of the control circuit according to FIGS. 3 to 5 can be selectively used.

The difference in the circuit arrangements of FIGS. 2 and 6 is to be seen in the fact that in the one case, the voltage supply for the control voltage respectively for the relay is switched via the operating switch, while in FIG. 6, the operating switch is connected in series to the set input. This results in that the wiper installation completes its wiping cycle when the operating switch is switched off again. In contrast thereto in the embodiment according to FIG. 2, the relay de-energizes immediately when the operating switch is switched off so that the motor immediately changes its direction of rotation and without running into the end position enters the parking position forthwith.

It is additionally pointed out that the capacitor 100 in FIG. 3 shown by dotted lines clears the storage 53 when the operating voltage is switched on.

What is claimed is:

1. A windshield wiper circuit arrangement comprising:

an electric drive motor which is reversible with respect to the direction of rotation;

a voltage source having first and second terminals each of a different polarity;

a reversing switch interposed between said motor and said voltage source and having a first changeover bridging contact in cooperative switching relationship with a first pair of stationary contacts, and a second changeover bridging contact in cooperative switching relationship with a second pair of stationary contacts, said bridging contacts being carried by and simultaneously operable by a relay;

limit switch means for characterizing first and second rotational end positions of said motor; and store means for controlling said relay, and for storing a representation of the switching state of said relay in at least one of said end positions, said store having a set input and a reset input;

said limit switch means alternately connecting one of said first pair of stationary contacts to said first and second terminals and concurrently alternately connecting one of said second pair of stationary contacts to said second and first terminals;

said set input and said reset input receiving control signals from said limit switch when said limit switch indicates said first or second position; the other of said stationary contacts being connected to the same terminal of said voltage source.

2. A circuit arrangement according to claim 1, wherein said limit switch comprises two two-way switches, whereby when said limit switch indicates said second position, one of said bridging contacts is connected to said first terminal, the other one of said bridging contacts being connected to said second terminal, and whereby when said limit switch indicates said first position, said other one of said bridging contacts is connected to said first terminal, said one bridging contact being connected to said second terminal.

3. A circuit arrangement according to claim 2, wherein said bridging contacts of the limit switch are connected with said stationary contacts of said reversing switch for conducting current to said motor current.

4. A circuit arrangement according to claim 3, wherein said motor is switched on by a switching operation of said relay via the limit switch.

5. A circuit arrangement according to claim 4, wherein a time interval passes between switching off of the motor and switching it on again in reverse direction of rotation.

6. A circuit arrangement according to claim 5, wherein the interval time is adjustable.

7. A circuit arrangement according to claim 6, wherein the interval time is adjustable in the parking position but fixed in the end position.

8. A circuit arrangement according to claim 6 comprising a single regulating element for adjusting the time interval in the parking position and in the end position.

9. A circuit arrangement according to claim 8 comprising a delay network for determining the interval time connected to the set input of said store.

* * * * *